United States Patent
Toyomaki et al.

(10) Patent No.: US 8,670,665 B2
(45) Date of Patent: Mar. 11, 2014

(54) OPTICAL APPARATUS USING POLARIZED ORTHOGONAL CONTROL

(75) Inventors: Takashi Toyomaki, Kawasaki (JP);
Noriaki Mizuguchi, Kawasaki (JP);
Yoichi Oikawa, Sapporo (JP)

(73) Assignee: Fujitsu Limited, Kawasaki (JP)

(*) Notice: Subject to any disclaimer, the term of this patent is extended or adjusted under 35 U.S.C. 154(b) by 1533 days.

(21) Appl. No.: 11/950,222

(22) Filed: Dec. 4, 2007

(65) Prior Publication Data
US 2008/0166128 A1    Jul. 10, 2008

(30) Foreign Application Priority Data
Dec. 5, 2006 (JP) ................. 2006-328447

(51) Int. Cl.
*H04B 10/00* (2013.01)
*H04B 10/532* (2013.01)

(52) U.S. Cl.
CPC .................. *H04B 10/532* (2013.01)
USPC ........................................... 398/32

(58) Field of Classification Search
CPC ................................................ H04B 10/532
USPC ..................................................... 398/32, 184
See application file for complete search history.

(56) References Cited

U.S. PATENT DOCUMENTS

| | | | | |
|---|---|---|---|---|
| 7,072,592 B2* | 7/2006 | Sarraf | .................. | 398/208 |
| 7,120,330 B2* | 10/2006 | Jander et al. | .................. | 385/24 |
| 7,268,936 B2* | 9/2007 | Onaka et al. | .................. | 359/341.41 |
| 7,302,182 B2* | 11/2007 | Carrick et al. | .................. | 398/95 |
| 7,522,785 B2* | 4/2009 | Yao | .................. | 385/11 |
| 2002/0048063 A1* | 4/2002 | Jung et al. | .................. | 359/124 |
| 2002/0154372 A1* | 10/2002 | Chung et al. | .................. | 359/182 |
| 2006/0153497 A1 | 7/2006 | Jander et al. | | |
| 2006/0250608 A1* | 11/2006 | Carrick et al. | .................. | 356/213 |

FOREIGN PATENT DOCUMENTS

JP    2005-51713    2/2005

OTHER PUBLICATIONS

3GPP TR 25.899 V6.1.0 (Sep. 2004) Technical Report, 3rd Generation Partnership Project: Technical Specification Group Radio Access Network; High Speed Download Packet Access (HSDPA) Enhancements (Release 6), pp. 1-68.
3GPP TS 25.104 V7.4.0 (Jun. 2006) Technical Report, 3rd Generation Partnership Project; Technical Specification Group Radio Access Network; Base Station (BS) Radio Transmission and Reception (FDD) (Release 7), pp. 1-77.
Japanese Patent Office Notification of Reasons for Rejection mailed May 31, 2011 for corresponding Japanese Patent Application No. 2006-328447.

* cited by examiner

*Primary Examiner* — Danny Leung
(74) *Attorney, Agent, or Firm* — Staas & Halsey LLP (57) ABSTRACT

An optical apparatus comprising, converting units converting electrical signals into signal lights with different wavelength, polarization control units controlling polarizing states of the signal lights into polarization controlled lights respectively, an optical multiplexer multiplexing the polarization controlled lights into a multiplexed light, an optical branching unit branching the multiplexed light and outputting a branched light, a polarizing unit extracting only signal lights of the specified polarizing state from the branched light into an extracted light, and a control unit detecting intensity of the extracted light. Pilot signals are applied to modulate the electrical signals or the polarization controls. The polarization control units controls the polarizing states of the signal lights based on the pilot signal frequencies of the detection result by the control unit.

5 Claims, 12 Drawing Sheets

OPTICAL APPARATUS USING POLARIZED ORTHOGONAL CONTROL

The present invention claims foreign priority to Japanese application 2006-328447, filed on Dec. 5, 2006, which is incorporated herein by reference in its entirety.

FIELD OF THE INVENTION

A wavelength division multiplex (WDM) transmission system is known to be one of the high-speed and large capacity optical transmission systems. Recently, a technology for transmitting WDM light of 1000 wavelengths or more has been researched. In order to increase the number of multiplexed wavelengths, that is, the number of channels, a wavelength interval of WDM light must be narrowed.

However, when a wavelength interval of WDM light becomes narrow, crosstalk between adjacent channels becomes highly possible. In order to eliminate such crosstalk, a polarized orthogonal control technology that suppresses interference between adjacent channels has been known.

For example, one of the known WDM transmitting terminals has five or more optical transmitters and wavelength interval of output signal lights from the optical transmitters have no periodicity and when re-using a specific wavelength interval, pair of signals using the specific wavelength interval are separated more than two channels. Also, the known terminal has a polarized state control unit controlling the polarized states of the signal lights in order to make the polarized states of the adjacent signal light crossing in orthogonal at an output end of the terminal.

In another one of the known terminal, in order to transmit output signal light with multiplexed signal lights where adjacent signal lights are in the orthogonal polarizing direction, two steps of multiplexing are processed.

At the first step, signal lights with orders of odd number are combined to a first multiplexed light and signal lights with orders of even number are combined to a second multiplexed light. Then, the polarization of the first multiplexed light and the second multiplexed light are controlled so that the polarization direction of the second multiplexed light becomes orthogonal to the polarization direction of the first multiplexed light.

At the second step, the first multiplexed light and the second multiplexed light are combined. In the two steps, output signal light with multiplexed signal lights that adjacent signal lights are in the orthogonal polarizing direction, with each polarized state of the multiplexed signal lights is maintained.

In the WDM transmission system utilizing the polarized orthogonal control technology, in order to eliminate crosstalk, it is required to realize perfect orthogonal cross of polarizing directions of adjacent channels. However, in the polarized orthogonal control apparatus of related arts, it is not easy to detect whether adjacent channels are orthogonal in the polarizing direction, or to realize orthogonal polarizing directions of adjacent channels on the basis of the result of detection.

SUMMARY

According to an aspect of an embodiment, an optical apparatus comprises a plurality of converting units converting a plurality of electrical signals into a plurality of signal lights, wavelength of the plurality of signal lights being different from each other, a plurality of polarization control units controlling polarizing states of the plurality of signal lights and outputting a plurality of polarization controlled lights respectively, an optical multiplexer multiplexing the plurality of polarization controlled lights into a multiplexed light, an optical branching unit branching the multiplexed light and outputting a branched light, a polarizing unit extracting only signal lights of the specified polarizing state from the branched light and outputting an extracted light, and a control unit detecting intensity of the extracted light and controlling the plurality of polarization control units on the basis of the detection result, wherein the plurality of electrical signals are modulated by a plurality of pilot signals respectively and the detection of the control unit is based on the plurality of pilot signals.

DESCRIPTION OF THE PREFERRED EMBODIMENTS

Reference will now be made in detail to embodiments of the present invention, examples of which are illustrated in the accompanying drawings, wherein like reference numerals refer to like elements throughout.

In the following description, n is an integer of 2 or larger and k is an integer ranging from 1 to n, and the (k)th channel and the (k+1)th channels are defined as adjacent channels. In each embodiment explained below, the like structures are designated with identical reference numerals for simplifying the description.

First Embodiment

Figure 1:
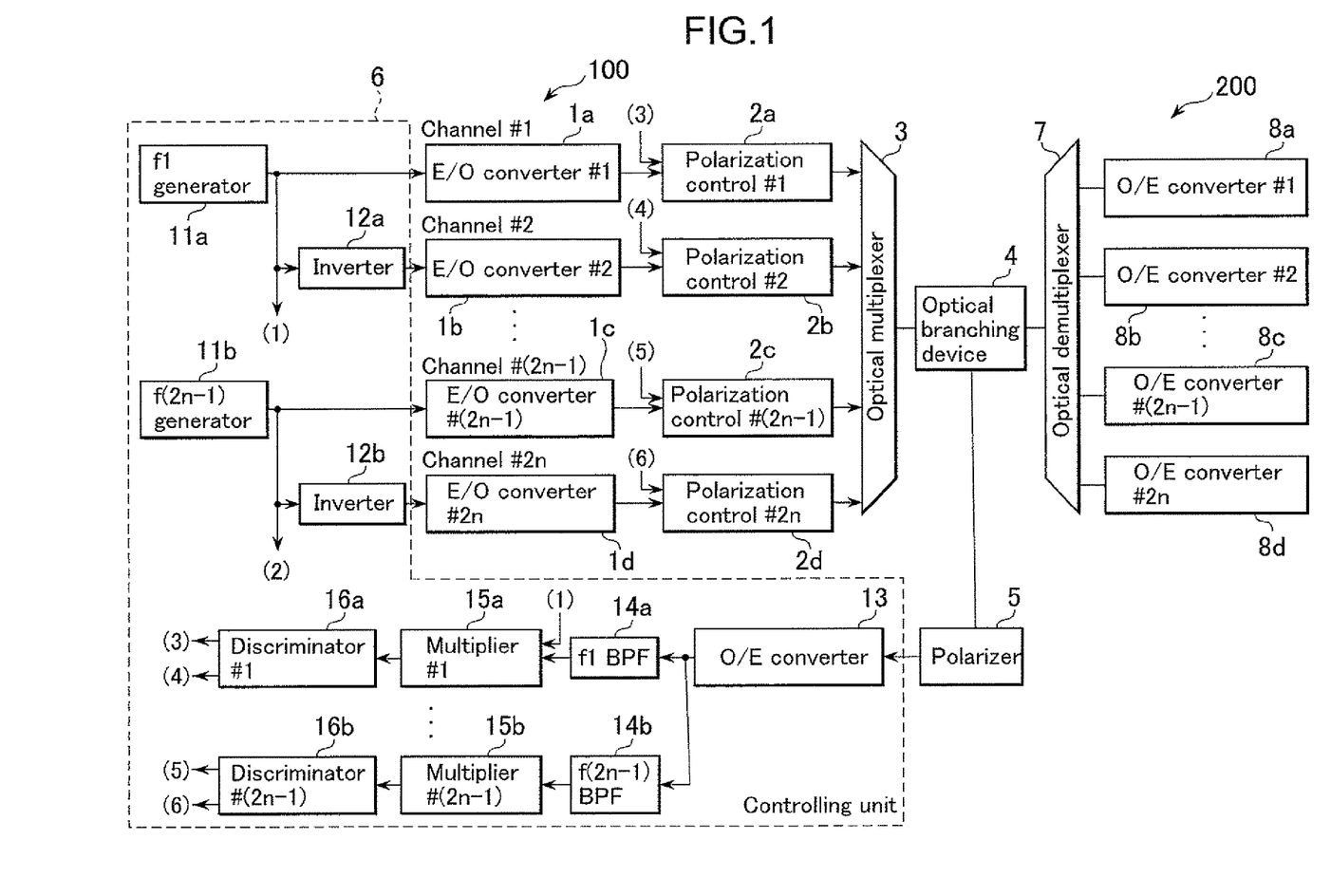
FIG. 1 is a block diagram showing a structure of a polarized orthogonal control apparatus in a first embodiment.

FIG. 1 is a block diagram showing a structure of a polarized orthogonal control apparatus in a first embodiment. As shown in FIG. 1, the polarized orthogonal control apparatus of the first embodiment includes an optical transmitter 100 having 2k of electro-optical converters (1a, 1b, 1c, and 1d), 2k of polarization controllers (2a, 2b, 2c, and 2d), an optical multiplexer 3, an optical branching device, a polarizer 5, and a control unit 6.

The electro-optical converters 1a, 1b, 1c and 1d are provided for every channel and are respectively equipped with a light emitting element, such as a laser diode and convert an electrical signal into a signal light. The polarization controllers 2a, 2b, 2c, 2d are provided for every channel. The (2k−1)th polarization controller 2a, 2c and the (2k)th polarization controller 2b, 2d respectively control the polarization state of the signal lights output respectively from the (2k−1)th electro-optical converter 1a, 1c and the (2k)th electro-optical converter 1b, 1d.

The optical multiplexer 3 multiplexes signal lights respectively output from polarization controllers 2a, 2b, 2c, and 2d. The optical branching device 4 branches the output light from the optical multiplexer 3 to optical receiver 200 and the controller 6. The polarizer 5 extracts only signal light in the particular polarization state from the signal lights output from the optical branching device 4. The controller 6 controls the polarization controllers 2a, 2b, 2c, 2d to satisfy orthogonal condition in the polarizing directions of the (2k−1)th channel and the (2k)th channel.

The controller 6 is provided with k of pilot signal generators (11a, 11b), k of inverters (12a, 12b), an optical-electro converter 13, k of multipliers (15a, 15b), and k of discriminators (16a, 16b). The pilot signal generators 11a, 11b generate low-frequency signals of different frequencies as pilot signals. The pilot signal output from the (2k−1)th pilot signal generator 11a, 11b is supplied to the (2k−1)th electric-optical converter 1a, 1c.

The inverters 12a, 12b invert phase of the pilot signal output from the pilot signal generators 11a, 11b. The pilot signal output from the inverters 12, 12b is supplied to the (2k)th electro-optical converters 1b, 1d. The electro-optical converters 1a, 1b, 1c, and 1d respectively conduct intensity modulation by superposing the pilot signal on the electric signal.

The optical-electro converter 13 is equipped with a light receiving element such as a photodiode and converts a signal light output from the polarizer 5 into an electric signal. Filters 14a, 14b are respectively equipped with a band-pass filter for transmitting only the signal of the frequency identical to the pilot signal of each channel among the signal lights output from the optical-electro converter 13. That is, the (2k−1)th filter 14a, 14b allows the signals corresponding to the signal lights output from the (2k−1)th and (2k)th electro-optical converters 1a, 1b, 1c, and 1d.

The multipliers 15a, 15b synchronously detect the signal having passed the filters 14a, 14b. For this purpose, the (2k−1)th multiplier 15a, 15b multiplies the signal having passed the (2k−1)th filter 14a, 14b and the pilot signal output from the (2k−1)th pilot signal generator 11a, 11b.

The (2k−1)th discriminator 16a, 16b control the polarization state of the signal light having passed the (2k−1)th and (2k)th polarization controllers 2a, 2b, 2c, and 2d to obtain the maximum output from the (2k−1)th multiplier 15a, 15b. As will be described later, when an output value of the multiplier 15a, 15b becomes the maximum value, the polarizing direction of the (2k−1)th channel becomes orthogonal to the polarizing direction of the (2k)th channel.

In the first embodiment, the condition for achieving orthogonal polarizing direction of the (2k−1)th channel and the (2k)th channel is that the output values of the multipliers 15a, 15b become the maximum values.

The optical receiver 200 is provided with an optical demultiplexer 7 demultiplexing an signal light output from the optical branching device 4 into 2k light signals of different wavelengths in every channel and 2k optical-electro converters 8a, 8b, 8c, and 8d for converting 2k signal lights output from this optical demultiplexer 7. Here, the polarized orthogonal control apparatus in the first embodiment may be equipped only with the optical transmitter 100 or may be equipped with both optical transmitter 100 and optical receiver 200.

Next, a reason why the polarizing directions become orthogonal in the (2k−1)th channel and the (2k)th channel when both multipliers 15a, 15b provide the maximum outputs will be explained. When an optical power of the pilot signal output from the pilot signal generators 11a, 11b is expressed with the following equation (1) optical powers of the pilot signals of the (2k−1)th channel and the (2k)th channel when the optical power is intensity-modulated with the pilot signal can be expressed respectively with the equations (2) and (3). However, light intensity is indicated as A, angular velocity as $\omega$, and time as t, respectively.

$$f(2k-1) = A \times \sin \omega t \quad (1)$$

$$f(2k-1) = A \times \sin \omega t \quad (2)$$

$$-f2k = -A \times \sin \omega t \quad (3)$$

A polarizing plane of the polarizer 5 is defined as the standard optical phase angle. For the (2k−1)th channel, the control target is set to set the polarizing angle of this channel is set to the identical phase with the standard optical phase angle. Moreover, for the (2k) channel, the control target is set the polarizing angle of this channel orthogonal to the standard optical phase angle (namely, the polarizing angle is deviated by 90° from the standard optical phase angle).

Figure 2:
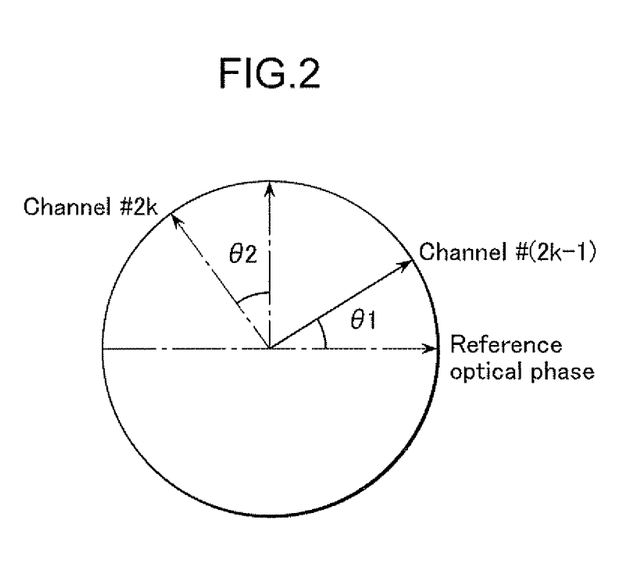
FIG. 2 is a diagram for explaining the polarization control principle in the polarized orthogonal control apparatus in the first embodiment.
Figure 3:
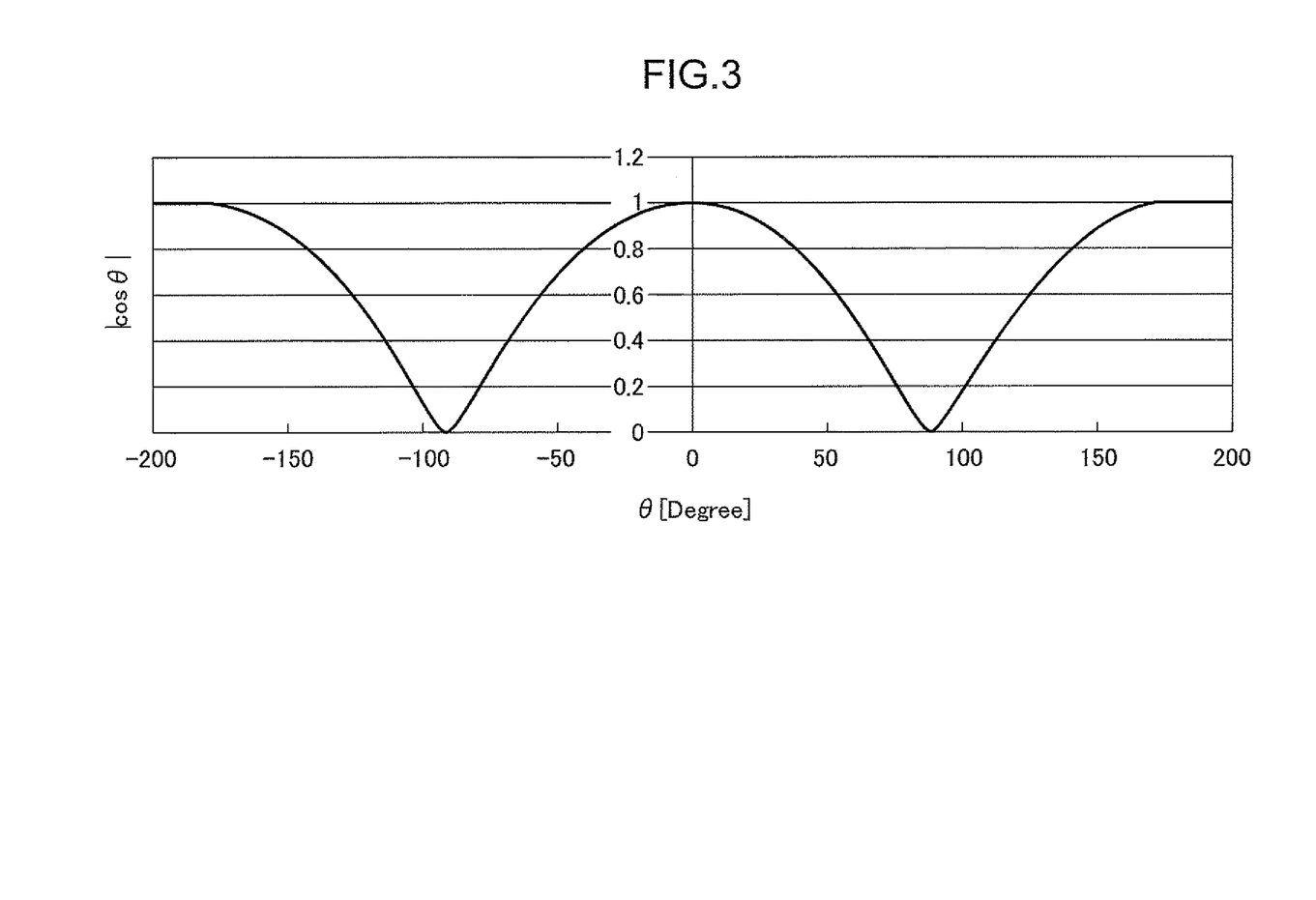
FIG. 3 is a diagram for explaining a polarization control principle of the polarized orthogonal control apparatus in the first embodiment.
Figure 4:
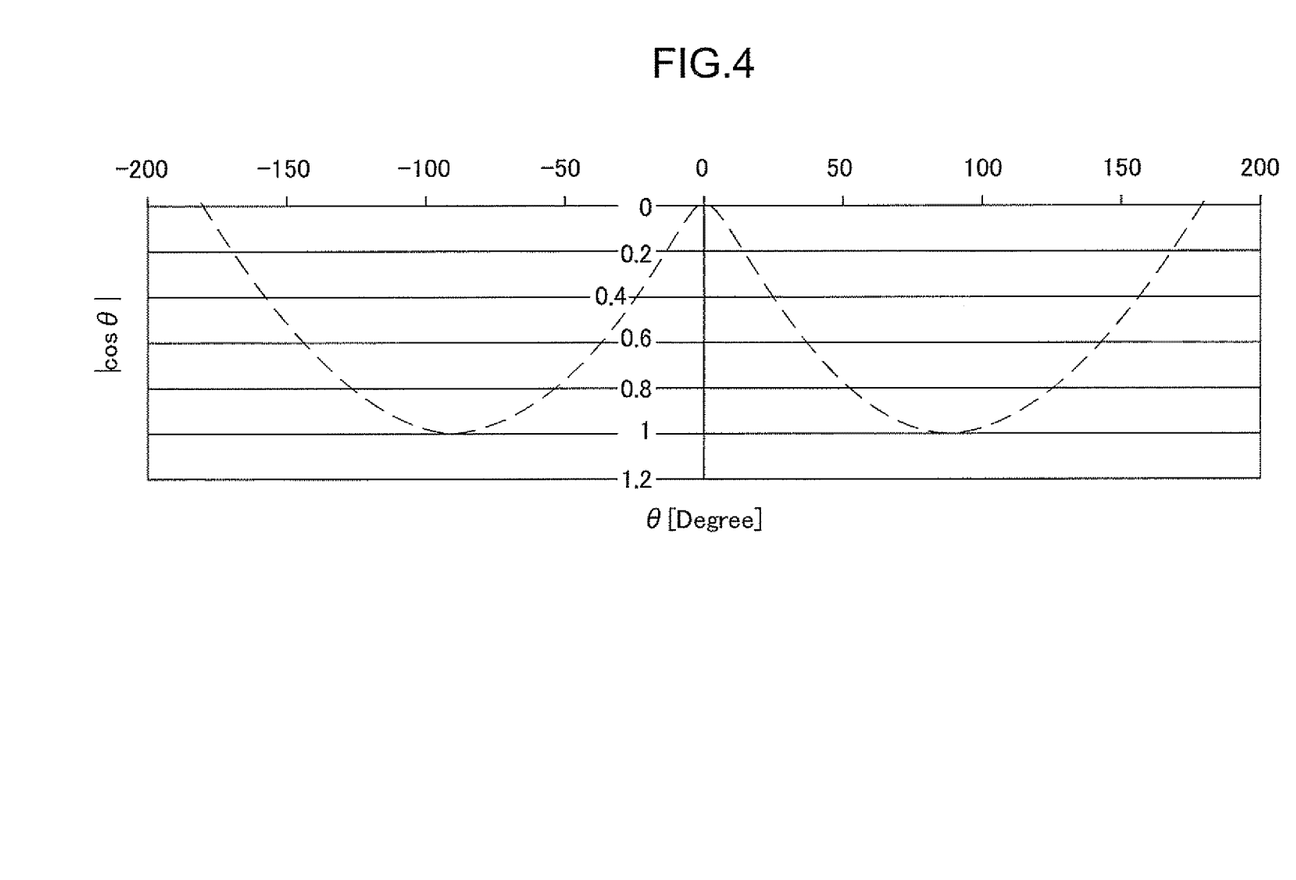
FIG. 4 is a diagram for explaining the polarized control principle of the polarized orthogonal control apparatus in the first embodiment.

FIG. 2 to FIG. 4 are diagrams for explaining the polarization control principle in the polarized orthogonal control apparatus of the present embodiment. As shown in FIG. 3, if the polarizing angle of each channel is deviated from the standard optical phase angle, an optical power intensity modulation degree for such deviation changes. An optical power intensity modulation degree of the (2k−1)th channel is expressed with the following equation (4) when the polarizing angle of the relevant channel and the reference optical phase angle are in the in-phase state and if the in-phase state is deviated by only $\theta$ 1 radian, above modulation degree is expressed with the following equation (5).

$$A \times \sin \omega t \times |\cos 0| = A \times \sin \omega t \quad (4)$$

$$A \times \sin \omega t \times |\cos \theta 1| \quad (5)$$

The pilot signal of the (2K)th channel is inverted, as explained above, with inverters 12a, 12b. Therefore, an optical power intensity modulation degree of the (2k)th channel is expressed with the following equation (6) when the polarizing angle of the relevant channel and the reference optical phase angle are in the orthogonal relationship and if the orthogonal state is deviated only by $\theta$ 2 radian, such modulation degree is expressed with the equation (7).

$$A \times \sin \omega t \times (-|\sin 0|) = 0 \quad (6)$$

$$A \times \sin \omega t \times (-|\sin \theta 2|) \quad (7)$$

Since the pilot signals of the identical frequency are superposed in the (2k−1)th channel and the (2k)th channel, an optical power of the pilot signal detected with the (2k−1)th multiplier 15a, 15b is equal to the power attained by adding the powers of the equations (5) and (7). Accordingly, a voltage of the output signal of the (2k−1)th multiplier 15a, 15b is determined with the following equation (8).

$$|\cos \theta 1| - |\sin \theta 2| \quad (8)$$

FIG. 3 shows a relationship of $|\cos \theta|$ for the angle $\theta$. In addition, FIG. 4 shows a relationship of $-|\sin \theta|$ for the angle $\theta$. It is obvious from FIG. 3 and FIG. 4 that the maximum value can be obtained from the equation (8) within the range equal to −180° or more but 180° or less when both θ 1 and θ 2 are equal to −180°, 0°, or 180°.

Thus, when the polarizing angle of the (2k−1)th channel is matched with (or inverted from) the phase of the reference optical phase angle and the polarizing angle of the (2k)th channel is orthogonal to the reference optical phase angle, that is when the polarizing angle of the (2k−1)th channel is orthogonal to the polarizing angle of the (2k)th channel, an output voltage of the (2k−1)th multiplier 15a, 15b has the maximum value.

Accordingly, the orthogonal polarizing directions may be attained in the adjacent channels by controlling each polarization controller 2a, 2b, and 2c to provide the maximum output voltage of each multiplier 15a, 15b, that is, the maximum input voltage of each discriminator 16a, 16b.

Second Embodiment

Figure 5:
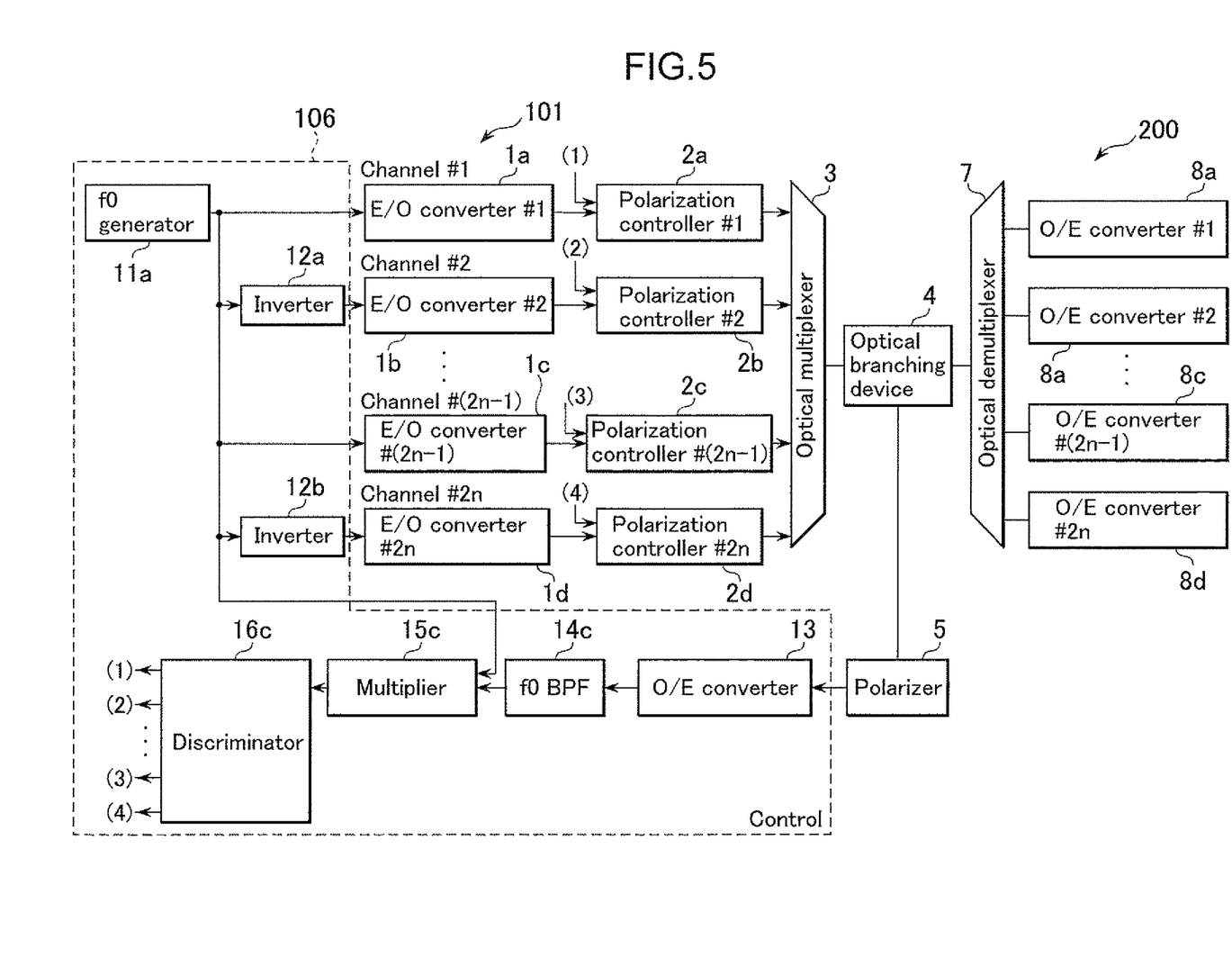
FIG. 5 is a block diagram showing a structure of the polarized orthogonal control apparatus in a second embodiment.

FIG. 5 is a block diagram showing a structure of the polarized orthogonal control apparatus as a second embodiment. As shown in FIG. 5, the second embodiment has a structure that the control unit 106 of the optical transmitter 101 includes a pilot signal generator 11c, a filter 14c, a multiplier 15c, and a discriminator 16c and these elements are used in common for all channels.

In the second embodiment, the pilot signal output from the pilot signal generator 11c is supplied to the (2k−1)th electro-optical converter 1a, 1c. To the (2k)th electro-optical converter 1b, 1d, the pilot signal output from the pilot signal generator 11c and is then inverted with the inverter 12a, 12b.

The filter 14c is formed of a band-pass filter sending only the signal of the frequency equal to that of the pilot signal output from the pilot signal generator 11c among the signal lights output from the optical-electro converter 13. The multiplier 15c implements synchronous detection of the signal having passed the filter 14c by multiplying the signal having passed the filter 14c and the pilot signal output from the pilot signal generator 11c.

The discriminator 16c controls polarizing state of the signal light passing through the (2k−1)th and (2k)th polarization controllers 2a, 2b, 2c, and 2d to satisfy the condition assuring orthogonal relationship of the polarizing directions in both (2k−1)th channel and the (2k)th channel. This condition ensures the maximum output value of the multiplier 15c. The reason is identical to that explained with reference to FIG. 2 to FIG. 4 in the first embodiment. However, the multiplier 15c detects a total sum of optical power of the (2k−1)th channel and a total sum of optical power of the (2k)th channel. The other structure is identical to that in the first embodiment.

In the second embodiment, adjustment is necessary in the following procedures when the optical transmitter 101 is activated. First, the third (omitted in FIG. 5) to the (2n)th channels are in the extinct state and the first and second polarization controllers 2a, 2b are manipulated to provide the maximum output voltage of the multiplier 15c.

Next, while the first and the second channels are kept in the light emitting state, the fifth (omitted in FIG. 5) to the (2n)th channels are in the extinct state and moreover the third to fourth polarization controller (omitted in FIG. 5) is manipulated to provide the maximum output voltage of the multiplier 15c. Such manipulations are continued up to the (2k−1)th and (2k)th channels.

Third Embodiment

Figure 6:
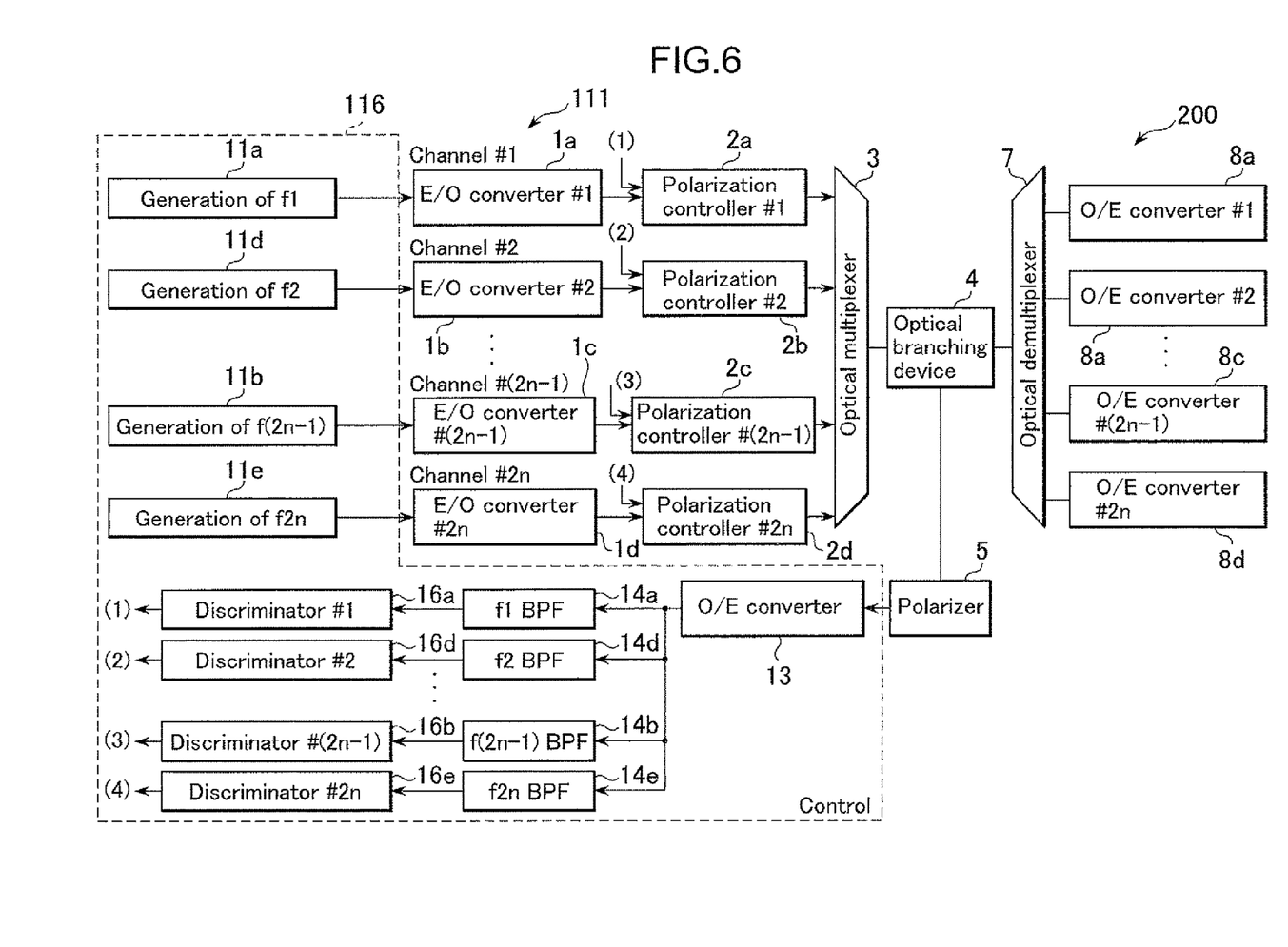
FIG. 6 is a block diagram showing a structure of the polarized orthogonal control apparatus in a third embodiment.

FIG. 6 is a block diagram showing a structure of the polarized orthogonal control apparatus as a third embodiment. As shown in FIG. 6, the third embodiment has a structure that pilot signal generators 11a, 11b, 11d, and 113, filters 14a, 14b, 14d, and 14e, and discriminators 16a, 16b, 16d, and 16e are provided for each channel in the control unit 116 of the optical transmitter 111 and the pilot signals of different frequencies are superposed in each channel.

Accordingly, in the third embodiment, an inverter and a multiplier for synchronous detection are not required. Moreover, the (2k−1)th discriminator 16a, 16b controls the polarizing state of the signal light passing the (2k−1)th polarization controller 2a, 2c to provide the maximum output voltage of the (2k−1)th filter 14a, 14b. In this case, the (2k)th discriminator 16d, 16e controls the polarizing state of the signal light passing the (2k)th polarization controller 2b, 2d to provide the minimum output voltage of the (2k)th filter 14d, 14e.

Otherwise, it may be possible to control the polarization controllers 2a, 2b, 2c, and 2d to provide the minimum output voltage of the (2k−1)th filter 14a, 14b and to provide the maximum output voltage of the (2k)th filter 14d, 14e. This control realizes orthogonal crossing in the polarizing directions for the (2k−1)th channel and the (2k)th channel. The reason is identical to that in the first embodiment.

Namely, optical powers of the pilot signals of the (2k−1)th channel and the (2k)th channel when the optical power intensity modulation is implemented using the pilot signals respectively output from the (2k−1)th pilot signal generator 11a, 11b and the (2k)th pilot signal generator 11d, 11e can be indicated with the following equations (9) and (10).

$$f(2k-1) = A \times \sin(2k-1)\omega t \qquad (9)$$

$$f2k = -A \times \sin 2k\omega t \qquad (10)$$

An optical power intensity modulation degree of the (2k−1)th channel is expressed with the following equation (11) when the polarizing angle of the relevant channel and the reference optical phase angle are in the in-phase state, and if the in-phase state is deviated only by θ 1 radian, such modulation degree is expressed with the following equation (12). Moreover, an optical power intensity modulation degree of the (2k)th channel is expressed with the following equation (13) when the polarizing angle of the relevant channel is orthogonal to the reference optical phase angle and if the orthogonal state is deviated only by θ 1 radian, such modulation degree is expressed with the following equation (14).

$$A \times \sin(2k-1)\omega t \qquad (11)$$

$$A \times \sin(2k-1)\omega t \times |\cos \theta 1| \qquad (12)$$

$$A \times \sin 2k\omega t \times |\sin 0| = 0 \qquad (13)$$

$$A \times \sin 2k\omega t \times |\sin \theta 2| \qquad (14)$$

Accordingly, it may be obvious from the equations (13) and (14) that both θ 1 and θ 2 are set to 0° or to 90° in order to attain the orthogonal state in the polarizing directions of the (2k−1)th channel and the (2k)th channel. The other structure is similar to that of the first embodiment.

Fourth Embodiment

Figure 7:
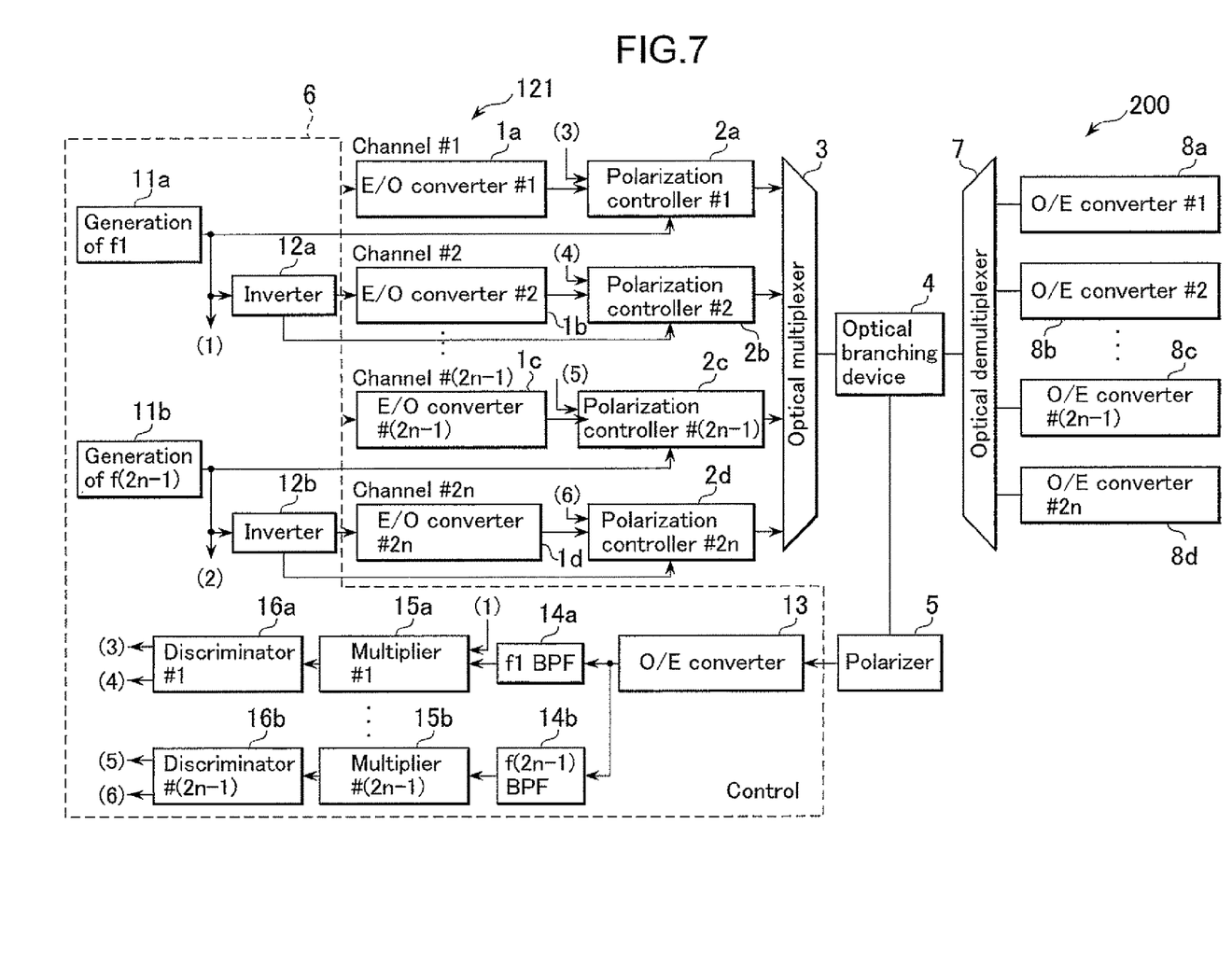
FIG. 7 is a block diagram showing a structure of the polarized orthogonal control apparatus in a fourth embodiment.

FIG. 7 is a block diagram showing a structure of the polarized orthogonal control apparatus as a fourth embodiment. As shown in FIG. 7, the fourth embodiment includes the optical transmitter 121 equipped to modulate, in the polarizing direction, the signal light passing the (2k−1)th polarization controller 2a, 2c with the pilot signal output from the (2k−1)th pilot signal generator 11a, 11b.

Moreover, the pilot signals output from the (2k−1)th pilot signal generator 11a, 11b and inverted with the inverters 12a, 12b modulate the signal light passing the (2k)th polarization controller 2b, 2d. When modulation is executed in the polarizing direction, it is identical to implementation of intensity modulation for optical power as in the case of the first embodiment as a result observed from the discriminator.

Figure 8:
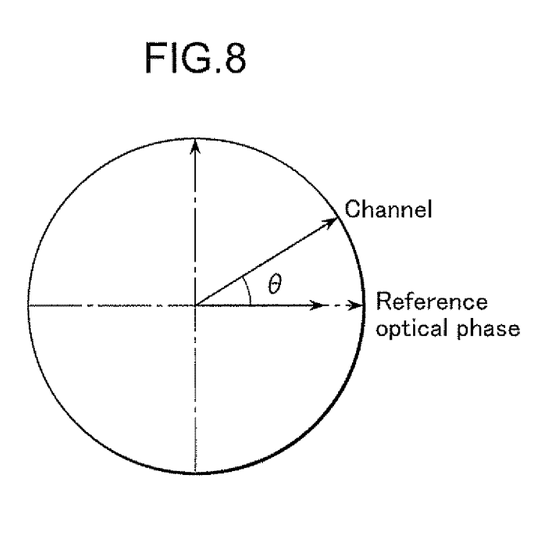
FIG. 8 is a diagram for explaining a modulation principle of the polarized orthogonal control apparatus in a fourth embodiment.
Figure 9:
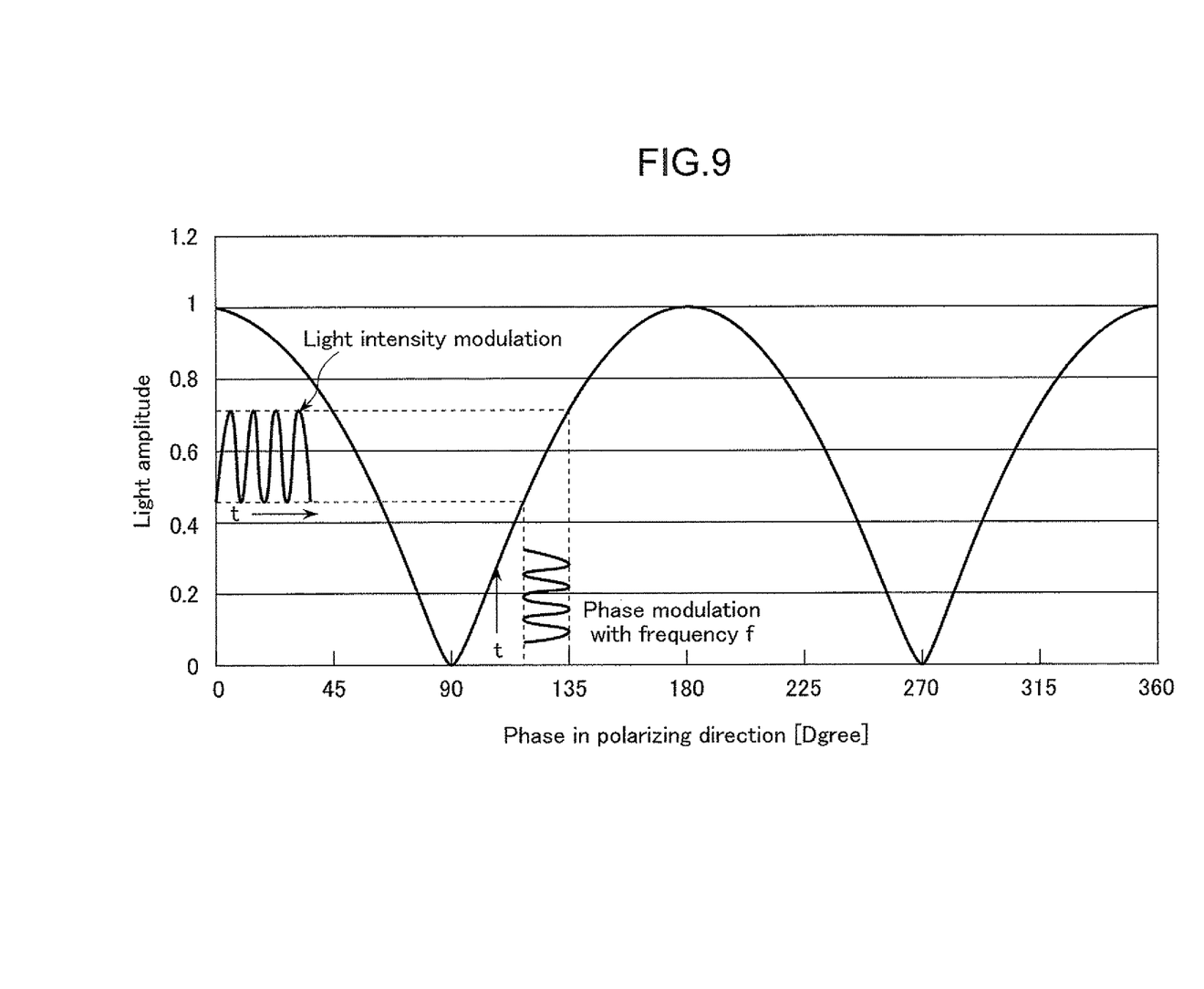
FIG. 9 is a diagram for explaining the modulation principle of the polarized orthogonal control apparatus in the fourth embodiment.

Realization of intensity modulation in the polarizing direction will be explained below. FIG. 8 and FIG. 9 explain the modulation principle in the polarized orthogonal control apparatus in the forth embodiment. As shown in FIG. 8, if it is assumed that the optimum condition may be attained for a certain channel, polarizing angle of an signal light and the reference optical phase angle are in the in-phase state (0°), optical intensity when the polarizing angle is deviated by θ from the optimum point becomes cos θ element of the optical intensity when it is matched with the optimum point, intensity is lowered than that when matching is attained.

As shown in FIG. 9, when an signal light of a certain channel is modulated with the frequency f in the phase direction, amplitude of the optical of such channel changes similar to the intensity modulation, the intensity modulation is realized with the modulation in the polarizing direction. The nearer the polarizing angle of signal light becomes, the more an optical power intensity modulation degree realized by modulation in the polarizing direction becomes nearly zero. This is inverted from the case of the pilot signal having the maximum amplitude at the optimum point.

Moreover, since slope of the curve (| cos θ| shown in FIG. 9 is positive in the side where phase is smaller than at the optimum point, while it is negative in the side where phase is larger, phase of intensity modulation at the optimum point is inverted by 180°. Whether phase of the signal light is deviated in the side where it is larger or smaller than the optimum phase can be detected by using the above phenomenon. The other structure is similar to the first embodiment.

Fifth Embodiment

Figure 10:
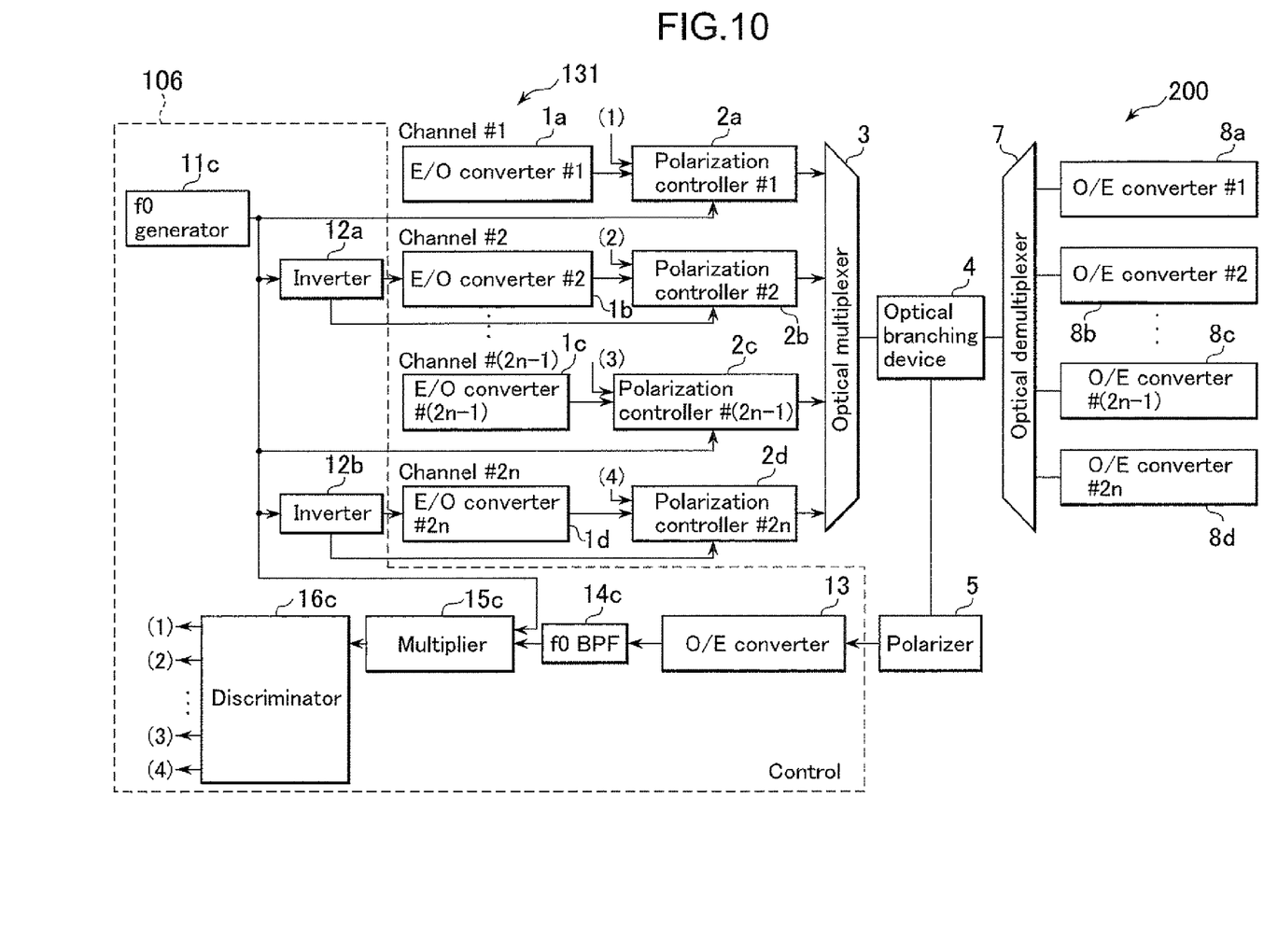
FIG. 10 is a block diagram showing a structure of the polarized orthogonal control apparatus in a fifth embodiment.

FIG. 10 is a block diagram showing a structure of the polarized orthogonal control apparatus as a fifth embodiment. As shown in FIG. 10, the fifth embodiment applies the fourth embodiment to the second embodiment. That is, the control unit 106 modulates the signal light passing the (2k−1)th polarization controller 2a, 2b in the polarizing direction with the pilot signal output from the pilot signal generator 11c.

Moreover, the control unit 106 modulates the signal light passing the (2k)th polarization controller 2b, 2d with the pilot signal inverted with the inverters 12a, 12b. The reason of intensity modulation with the modulation in the polarizing direction has already been explained in regard to the fourth embodiment. The other structure is similar to that of the second embodiment.

Sixth Embodiment

Figure 11:
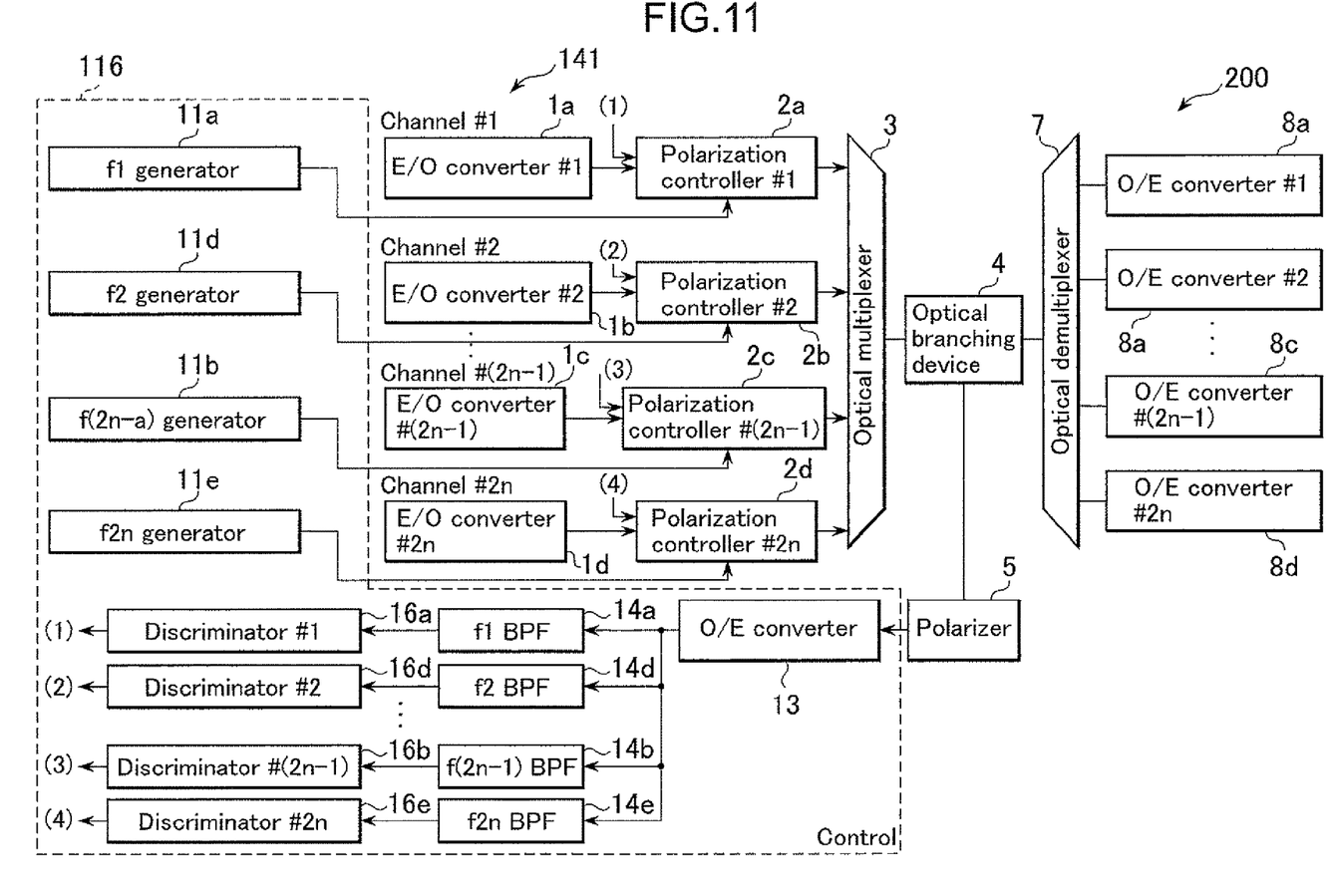
FIG. 11 is a block diagram showing a structure of the polarized orthogonal control apparatus in a six embodiment.

FIG. 11 is a block diagram showing a structure of the polarized orthogonal control apparatus as a sixth embodiment. As shown in FIG. 11, the sixth embodiment can be realized by applying the fourth embodiment to the third embodiment. Namely, In the optical transmitter 141, the control unit 116 modulates the signal light passing the polarization controller 2a, 2b, 2c, and 2d in the polarizing direction with the pilot signal output from each pilot signal generator 11a, 11d, 11b, and 11e. The reason for realization of the intensity modulation with modulation in the polarizing direction has also ready been explained in the fourth embodiment. The other structure is identical to that of the third embodiment.

Seventh Embodiment

Figure 12:
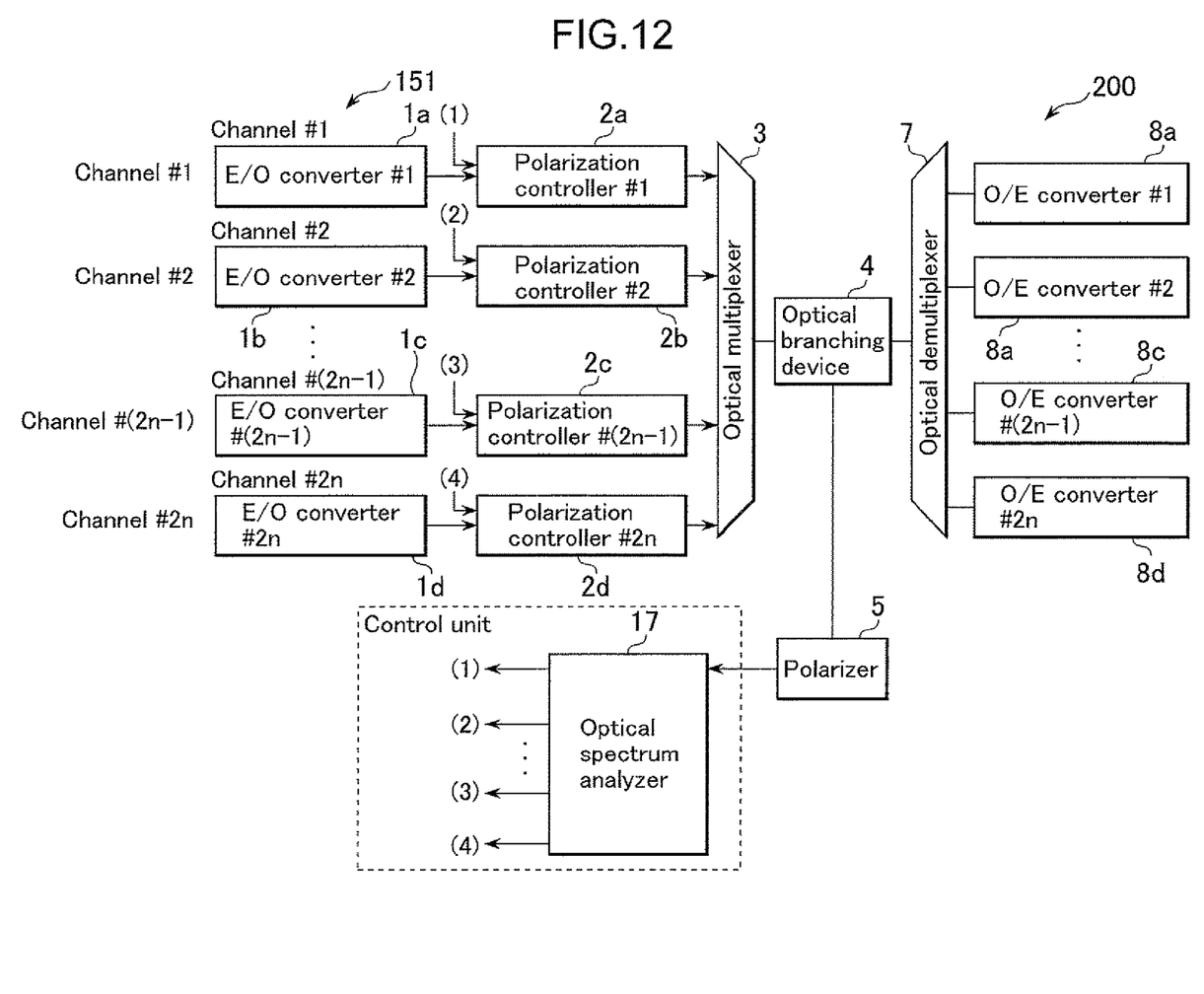
FIG. 12 is a block diagram sowing a structure of the polarized orthogonal control apparatus in a seventh embodiment.

FIG. 12 is a block diagram showing a structure of the polarized orthogonal control apparatus as a seventh embodiment. As shown in FIG. 12, the control unit 126 of the optical transmitter 151 is equipped with an optical spectrum analyzer 17 in the seventh embodiment. Accordingly, in this embodiment, the electro-optical converter for receiving the signal light output from the pilot signal generator, inverter, and polarizer 5, filter, multiplier, and discriminator are not required. The other structure is identical to that of the first embodiment.

The optical spectrum analyzer 17 measures intensity of an signal light output from the polarizer 5 all wavelengths for all wavelengths. The optical spectrum analyzer 17 controls the polarizing state of the signal lights passing the polarization controllers 2a, 2b, 2c, 2d to result in the minimum measured value for the (2k−1)th channel and the maximum measured value for the (2k)th channel. Or, the optical spectrum analyzer 17 may control the polarizing state of the signal lights passing the polarization controllers 2a, 2b, 2c, and 2d to result in the maximum measured value for the (2k−1)th channel and the minimum measured value for the (2k)th channel.

As explained above, in the embodiments explained above, states of polarizing direction of the adjacent channels can be detected with the multipliers 15a, 15b, 13c and discriminators 16a, 16b, 16c, 16d, and 16e or optical spectrum analyzer 17. Moreover, the polarizing direction of signal light of each channel can also be controlled realize orthogonal polarizing directions of the adjacent channels.

In addition, the first embodiment has an advantage that the number of frequencies of the necessary pilot signal can be reduced to a half in comparison with the third embodiment. Moreover, the second embodiment has an advantage that the apparatus may be simplified in the structure because only one pilot signal frequency is required. Further, the fourth, fifth, and sixth embodiments have advantage that the apparatus can be simplified in comparison with the first, second, and third embodiments, because only the polarizing direction control is required.

Meanwhile, the first, second, and third embodiments have advantage in comparison with the fourth, fifth, and sixth embodiment that accuracy after control for orthogonal polarizing direction of the signal lights of the adjacent channels is high, because the polarizing direction is not controlled, but the optical intensity is controlled. Moreover, the seventh embodiment has an advantage that the pilot signal is not required.

Although a few preferred embodiments of the present invention have been shown and described, it would be appreciated by those skilled in the art that changes may be made in these embodiments without departing from the principles and spirit of the invention, the scope of which is defined in the claim and their equivalents.

What is claimed is:
1. An optical apparatus, comprising:
 a plurality of converters to convert a pair of electrical signals into a pair of signal lights, wavelengths of the pair of signal lights being different from each other, the pair of electrical signals being modulated by a pair of pilot signals which comprise a normal phase and a reverse phase of the normal phase;

a plurality of polarization controllers to control polarizing states of the pair of signal lights and outputting a plurality of polarization controlled lights respectively;

an optical multiplexer to multiplex the plurality of polarization controlled lights into a multiplexed light;

an optical splitter to branch the multiplexed light and outputting a branched light;

a polarizer to extract light of a specified polarizing state from the branched light and outputting an extracted light; and a controller to detect an intensity of the extracted light and control the plurality of polarization controllers on the basis of the detected intensity, the detection of the controller being based on the pair of pilot signals.

2. The optical apparatus comprising:

a plurality of converting units converting a plurality of electrical signals into a plurality of signal lights, wavelength of the plurality of signal lights being different from each other;

a plurality of polarization control units controlling polarizing states of the plurality of signal lights and outputting a plurality of polarization controlled lights respectively;

an optical multiplexer multiplexing the plurality of polarization controlled lights into a multiplexed light;

an optical branching unit branching the multiplexed light and outputting a branched light;

a polarizing unit extracting only signal lights of a specified polarizing state from the branched light and outputting an extracted light; and a control unit detecting intensity of the extracted light and controlling the plurality of polarization control units on the basis of the detected intensity, wherein the plurality of electrical signals are modulated by a plurality of pilot signals respectively and the detection of the control unit is based on the plurality of pilot signals;

there are 2n of converting units and 2n of polarization control units, for n is an integer;

the signal lights from the (2k−1)th converting unit and (2k)th converting unit are in adjacent channels, for k is an integer between 1 to n;

the electrical signals input to the (2k−1)th converting unit and (2k)th converting unit are modulated with pilot signals with same frequency and with phases inverted each other, and;

frequencies of the pilot signals for the electric signals input to the (2k−1)th converting unit and (2k)th converting unit are different for different k.

3. A method comprising:

converting a pair of electrical signals modulated by a pair of pilot signals which comprise a normal phase and a reverse phase of the normal phase to a pair of signal lights which comprise a pair of adjacent wavelengths;

multiplexing the pair of signal lights into a multiplexed signal light;

extracting signal lights having a specific polarizing state from the multiplexed signal light and detecting power of the pair of pilot signals from the extracted signal lights, and;

controlling the polarization direction of the pair of signal lights based on the detected power of the pair of pilot signals.

4. A method comprising:

means for converting a pair of electrical signals modulated by a pair of pilot signals which comprise a normal phase and a reverse phase of the normal phase to a pair of signal lights which comprise a pair of adjacent wavelengths;

means for multiplexing the pair of signal lights into a multiplexed signal light;

means for extracting signal lights having a specific polarizing state from the multiplexed signal light and detecting power of the pair of pilot signals from the extracted signal lights, and;

means for controlling the polarization direction of the pair of signal lights based on the detected power of the pair of pilot signals.

5. An optical apparatus, comprising:

a plurality of converters to convert a plurality of pairs of electrical signals into a plurality of pairs of signal lights, respectively, each signal light being at a different wavelength from the other signal lights, each pair of electrical signals being modulated by a pair of pilot signals which comprise a normal phase and a reverse phase of the normal phase;

a plurality of polarization controllers to control polarizing states of the plurality of pairs of signal lights and outputting a plurality of polarization controlled lights respectively;

an optical multiplexer to multiplex the plurality of polarization controlled lights into a multiplexed light;

an optical splitter to branch the multiplexed light and outputting a branched light;

a polarizer to extract signal lights of a specified polarizing state from the branched light and outputting an extracted light; and a controller to detect an intensity of the extracted light and control the plurality of polarization controllers on the basis of the detected intensity, the detection of the controller being based on pilot signals.

\* \* \* \* \*